United States Patent
Kawanami

(10) Patent No.: US 8,147,148 B2
(45) Date of Patent: Apr. 3, 2012

(54) LENS-INTERCHANGEABLE CAMERA BODY AND CAMERA SYSTEM CAPABLE OF CHANGING COMMUNICATION METHOD WITH SELECTED SHOOTING MODE

(75) Inventor: Akihiro Kawanami, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/988,626

(22) PCT Filed: Mar. 27, 2009

(86) PCT No.: PCT/JP2009/001408
§ 371 (c)(1),
(2), (4) Date: Oct. 19, 2010

(87) PCT Pub. No.: WO2009/130849
PCT Pub. Date: Oct. 29, 2009

(65) Prior Publication Data
US 2011/0044682 A1    Feb. 24, 2011

(30) Foreign Application Priority Data

Apr. 21, 2008    (JP) .................. 2008-110303

(51) Int. Cl.
*G03B 17/00* (2006.01)

(52) U.S. Cl. ..................................... 396/439

(58) Field of Classification Search .................. 396/439, 396/529; 359/819, 827
See application file for complete search history.

(56) References Cited

U.S. PATENT DOCUMENTS

| | | | | |
|---|---|---|---|---|
| 5,036,399 A | * | 7/1991 | Mabuchi | 348/351 |
| 2007/0086778 A1 | * | 4/2007 | Tanaka | 396/529 |
| 2007/0140681 A1 | * | 6/2007 | Tanaka | 396/279 |
| 2009/0285572 A1 | * | 11/2009 | Shibuno et al. | 396/133 |

FOREIGN PATENT DOCUMENTS

| | | |
|---|---|---|
| JP | 04-273671 A | 9/1992 |
| JP | 2000-147361 A | 5/2000 |
| JP | 2001-350190 A | 12/2001 |
| JP | 2004-120011 A | 4/2004 |
| JP | 2005-084339 A | 3/2005 |
| JP | 2006-003462 A | 1/2006 |
| JP | 2007-006305 A | 1/2007 |
| JP | 2007-104364 A | 4/2007 |

* cited by examiner

*Primary Examiner* — Clayton E Laballe
*Assistant Examiner* — Warren Fenwick
(74) *Attorney, Agent, or Firm* — Canon USA Inc. IP Division

(57) ABSTRACT

The present invention relates to a camera system. The system includes a selector configured to select one of a still image shooting mode and a movie shooting mode, and a communication unit employing a plurality of communication methods by which communication between an interchangeable lens and a camera body is performed. If the still image shooting mode is selected by the selector and a lens information request command is sent from the camera body to the interchangeable lens, the communication unit operates such that information on the interchangeable lens is sent from the interchangeable lens to the camera body. If the movie shooting mode is selected by the selector, the communication unit operates such that the information on the interchangeable lens is sent from the interchangeable lens to the camera body even without the lens information request command being sent from the camera body to the interchangeable lens.

4 Claims, 8 Drawing Sheets

FIG. 4A

| CAMERA-BODY COMMAND | NUMBER OF DATA BYTES | MEANING OF COMMAND |
|---|---|---|
| 10H | 2 | REQUEST TO SEND OPTICAL DATA |
| 12H | 3 | REQUEST TO SEND CURRENT STATE |
| 14H | 4 | REQUEST TO RECEIVE OPERATIONAL DATA |
| 20H | 0 | COMMAND TO START AF OPERATION |

FIG. 4B

| LENS COMMAND | NUMBER OF DATA BYTES | MEANING OF COMMAND |
|---|---|---|
| 10H | 2 | REQUEST TO RECEIVE OPTICAL DATA |
| 12H | 3 | REQUEST TO RECEIVE CURRENT STATE |
| 14H | 4 | REQUEST TO RECEIVE LENS-SPECIFIC DATA |
| 20H | 0 | COMMAND TO START VARIOUS OPERATIONS |

LENS-INTERCHANGEABLE CAMERA BODY AND CAMERA SYSTEM CAPABLE OF CHANGING COMMUNICATION METHOD WITH SELECTED SHOOTING MODE

TECHNICAL FIELD

The present invention relates to lens-interchangeable digital camera systems each including an interchangeable lens and a camera body that can communicate with each other, in which the method of communication between the camera body and the interchangeable lens is suitably changed with a plurality of selectable shooting modes, whereby communication in the camera system is performed.

BACKGROUND ART

With the transition from film cameras to digital cameras including image pickup devices in recent years, cameras have become capable of not only shooting still images but also shooting simple moving images, just as video cameras can. Some of so-called single-lens reflex cameras with interchangeable lenses employ a movie shooting mode, in addition to a still image shooting mode. Single-lens reflex cameras described herein mean camera bodies in which subjects are observed through observation optical systems including so-called reflex mirrors, and camera bodies in which images are displayed on liquid crystal display monitors through which the images are observed.

When the still image shooting mode is selected, the camera body performs an operation of shooting a still image. When the movie shooting mode is selected, the camera body performs a continuous shooting operation. In the movie shooting mode, unlike in the still image shooting mode, actuators included in the interchangeable lens that are provided for focusing and aperture moving operations also need to operate continuously. To control driving of such actuators, it is important that the state of the interchangeable lens, including the focus and aperture states, are frequently monitored.

Monitoring of the state of the interchangeable lens and drive control of the actuators are realized by communication between the interchangeable lens and the camera body. However, known communication methods, in which only still image shooting is considered and therefore the speed of communication is low, are not suitable for continuous shooting. To solve such a problem, Patent Citation 1 discloses a technique in which, if an accessory that has been mounted on a camera body is found to employ a recent communication method, the clock rate of communication is increased.
Patent Citation 1: Japanese Patent Laid-Open No. 2001-350190

DISCLOSURE OF INVENTION

Technical Problem

In the foregoing communication technique, the camera body sends a communication request command (a lens information request command) to an interchangeable lens, and in response to this, the interchangeable lens sends data and information corresponding to the command from the camera body at the time of a subsequent communication operation.

Such a command communication method requires the camera body to perform, for example, one command communication operation for recognizing the state of the interchangeable lens and two other communication operations for data acquisition. In short, three communication operations are required in order to read data of two communication operations. In addition, even if the state of the interchangeable lens is not changed at all from the state in the last communication, whether or not the state of the interchangeable lens has been changed cannot be found unless the camera body sends another command (a lens information request command). Moreover, to enable the movie shooting mode, more frequent communication operations need to be performed for focus correction and aperture correction than in the still image shooting mode.

Thus, the known communication technique requires various redundant communication operations.

However, it is necessary that interchangeable lenses of known types be usable. This means that the camera body needs to be capable of adapting itself to known communication methods.

Solution to Problem

According to an aspect of the present invention, a camera system includes an interchangeable lens, a camera body, a selector configured to select one of a still image shooting mode and a movie shooting mode, and a communication unit configured to control bidirectional communication between the interchangeable lens and the camera body by means of a plurality of communication methods. If the still image shooting mode is selected by the selector and a lens information request command is sent from the camera body to the interchangeable lens, the communication unit operates such that information on the interchangeable lens is sent from the interchangeable lens to the camera body. If the movie shooting mode is selected by the selector, the communication unit operates such that the information on the interchangeable lens is sent from the interchangeable lens to the camera body even without the lens information request command being sent from the camera body to the interchangeable lens.

ADVANTAGEOUS EFFECTS OF INVENTION

Thus, while compatibility with known interchangeable lenses is maintained, an appropriate method of communication between the camera body and the interchangeable lens can be selected in accordance with the shooting mode of the camera body, whereby quick focus correction and appropriate exposure correction can be realized.

BRIEF DESCRIPTION OF THE DRAWINGS

FIG. 4A shows a table of communication commands.

FIG. 4B shows another table of communication commands

DESCRIPTION OF EMBODIMENTS

First Embodiment

A first embodiment of the present invention will now be described in detail with reference to the accompanying drawings.

The first embodiment concerns a lens-interchangeable, autofocus, single-lens-reflex, digital camera system having selectable shooting modes: a still image shooting mode and a movie shooting mode.

Figure 1:
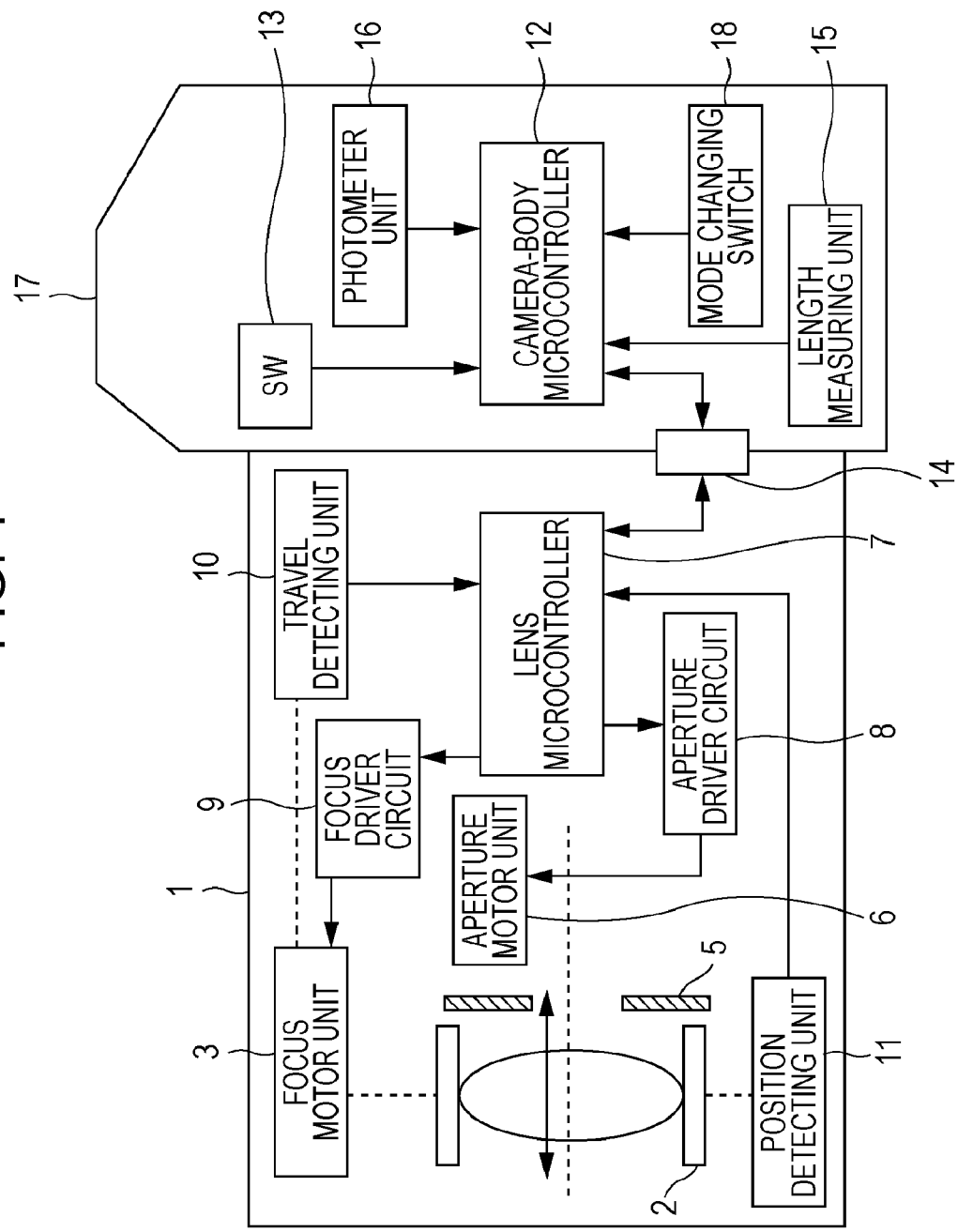
FIG. 1 is a block diagram of a single-lens reflex camera system.

FIG. 1 is a block diagram showing an interchangeable lens 1 and an autofocus, single-lens-reflex, digital camera body 17. Referring to FIG. 1, communication between and operations of the interchangeable lens 1 and the camera body 17 will first be described.

A focus lens unit 2 is moved by a focus motor unit 3. The focus motor unit 3 includes a focus motor configured to move the focus lens unit 2, and a series of gears configured to decelerate the focus motor. An aperture unit 5 is moved by an aperture motor unit 6. The aperture motor unit 6 includes an aperture motor configured to move the aperture unit 5, and a series of gears configured to decelerate the aperture motor. A lens microcontroller 7 includes a serial communication unit (a communication unit) configured to communicate with the camera body 17, a timer function, a digital-to-analog conversion (DAC) function, input and output ports, and memories including a read-only memory (ROM) and a random access memory (RAM). The serial communication unit employs a plurality of communication methods, such as synchronous clock communication, universal asynchronous receiver-transmitter (UART) communication, smart card communication, and universal serial bus (USB) communication. The lens microcontroller 7 includes at least two serial communication units.

An aperture driver circuit 8 drives the aperture motor unit 6. A focus driver circuit 9 drives the focus motor unit 3. A travel detecting unit 10 detects the amount of rotation of the focus motor. The lens microcontroller 7 controls the focus motor in accordance with a detection result obtained from the travel detecting unit 10. A position detecting unit 11 detects the position of the focus lens unit 2. A camera-body microcontroller 12 controls the entire operation of the camera body 17, and includes a serial communication unit (a communication unit) configured to communicate with the lens microcontroller 7, a timer function, a DAC function, input and output ports, and memories including a ROM and a RAM. The serial communication unit employs a plurality of communication methods, such as synchronous clock communication, UART communication, smart card communication, and USB communication. The camera-body microcontroller 12 includes at least two serial communication units. A release switch 13 is configured to issue two instructions: a focusing instruction when pressed halfway down (SW1), and a shooting instruction when pressed all the way down (SW2). A contact point unit 14 enables the camera-body microcontroller 12 and the lens microcontroller 7 to communicate with each other. A length measuring unit 15 is used for focus detection. In a general autofocus single-lens reflex camera body, focus is detected by detecting phase difference with a plurality of line sensors. Alternatively, in the case of movie shooting, focus is detected by moving the focus lens little by little. This is called a wobbling method. A photometer unit 16 determines the exposure with which shooting is performed. A mode changing switch 18 (a selector) is used for selecting a shooting mode of the camera body 17 from the still image shooting mode and the movie shooting mode.

Figure 2:
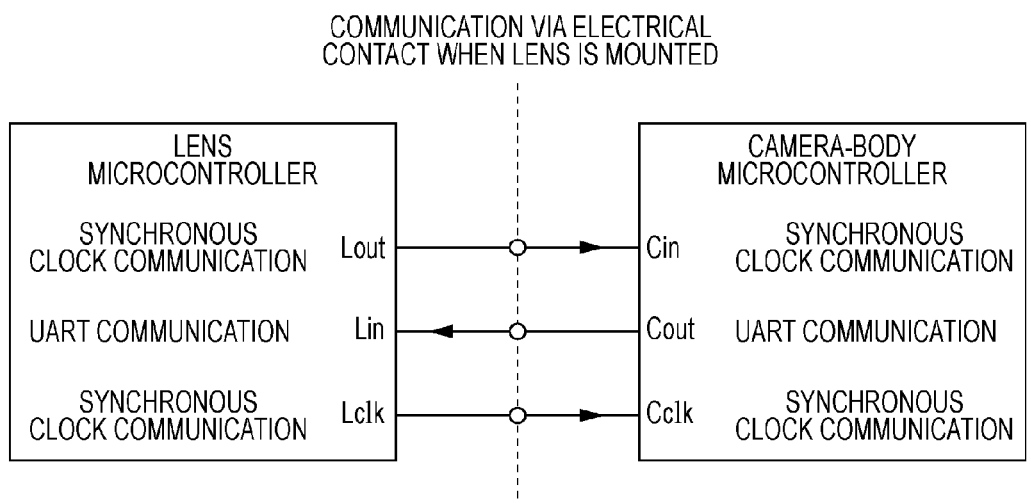
FIG. 2 shows a communication method according to a first embodiment of the present invention.

FIG. 2 shows communication performed between the camera body 17 and the interchangeable lens 1 in a case where a plurality of communication methods are employed, which is a major feature of the first embodiment. In FIG. 2, communication terminals of the lens microcontroller 7 are shown on the left, and communication terminals of the camera-body microcontroller 12 are shown on the right.

FIG. 2 shows a state where the movie shooting mode is selected with the mode changing switch 18. If the interchangeable lens 1 is a known lens that is not adapted to the movie mode, a corresponding known communication method is employed even in the movie shooting mode.

The lens microcontroller 7 and the camera-body microcontroller 12 are connected to each other via the contact point unit 14 mentioned above referring to FIG. 1. The lens microcontroller 7 has a lens data output terminal Lout employing synchronous clock communication, a camera-body-data input terminal Lin employing UART communication, and a synchronous clock output terminal Lclk employing synchronous clock communication. The camera-body microcontroller 12 has a lens data input terminal Cin employing synchronous clock communication, a camera-body-data output terminal Cout employing UART communication, and a synchronous clock input terminal Cclk employing synchronous clock communication.

In UART communication, which is synchronous communication performed on a time basis, the speed of communication cannot be increased very much because time lags often occur between microcontrollers and the like communicating with each other. Instead, UART communication only requires two communication terminals even in bidirectional communication. In the camera system according to the first embodiment in which the camera body 17 and the interchangeable lens 1 each include the communication units employing different communication methods, two types of communication, i.e., synchronous clock communication (a first communication method) and UART communication (a second communication method), are employed in the movie shooting mode. This is because drive commands and values for correcting the focus and aperture as described above that are output from the camera-body microcontroller 12 can be sufficiently handled at the speed of UART communication, that is, the speed of mechanical movement of motors and the like is lower than the speed of electrical signal communication.

Whereas, a large amount of information needs to be frequently sent from the lens microcontroller 7 to the camera-body microcontroller 12. The information sent from the lens microcontroller 7 includes lens-specific data, lens state information such as those described above, lens position information detected by the position detecting unit 11, and so forth. When the movie shooting mode is selected, these pieces of information change while the focus lens unit 2 and the aperture unit 5 are moved frequently. Communication needs to be performed in response to such changes.

Figure 3:
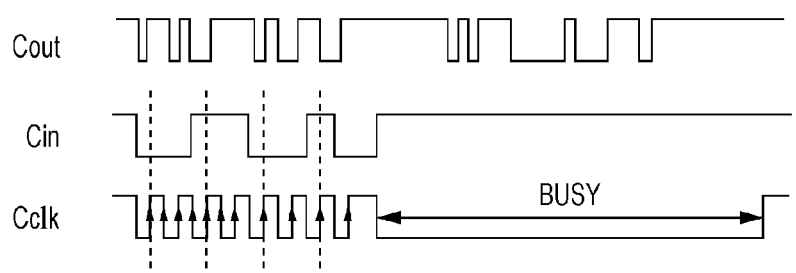
FIG. 3 shows communication waveforms.

In the movie shooting mode, the optimum communication method can be selected: a high-speed method for communication from the interchangeable lens 1 to the camera body 17, and a low-speed method for communication from the camera body 17 to the interchangeable lens 1. FIG. 3 shows signal waveforms at the respective communication terminals of Cout, Cin, and Cclk from the top. The terminal Cout employs UART communication and therefore is completely asynchronous with the other terminals. The terminals Cin and Cclk employ synchronous clock communication. Therefore, synchronously with the rise of the clock signal from the lens microcontroller 7 to the terminal Cclk, the camera-body microcontroller 12 receives data via the terminal Cin. A low-output period in the signal waveform at the terminal Cclk represents a busy state in which the camera-body microcontroller 12 lowers the signal level at the terminal Cclk, thereby waiting for an operation of the camera body 17 to be finished. When the operation is finished, the camera-body microcontroller 12 raises the signal level at the terminal Cclk.

FIGS. 4A and 4B shows tables of communication commands according to the first embodiment. FIG. 4A shows camera-body commands that are sent from the camera-body microcontroller 12 to the lens microcontroller 7. The camera-body commands are the same as those for known camera bodies, whereby compatibility with known interchangeable lenses is provided. The number of bytes, shown in FIG. 4A, of data output from the lens microcontroller 7 is determined beforehand by a command (a lens information request command).

Specifically, when a command 10H is sent from the camera-body microcontroller 12 to the lens microcontroller 7, the lens microcontroller 7 regards the command 10H as a request to send optical data, and sends two-byte data in accordance with the number of data bytes, which is 2 in this case, to the camera-body microcontroller 12 synchronously with the signal at the terminal Cclk. Other exemplary commands (lens information request commands) include the following. A command 12H is a request to send three-byte data indicating the lens state (during focusing and aperture adjustment). A command 14H is a request for the lens microcontroller 7 to receive four-byte operational data indicating the amounts of moving the focus lens unit 2 and the aperture unit 5. A command 20H, which is a zero-byte data, is a command to start an autofocus (AF) operation. When the lens microcontroller 7 receives the command 20H, the focus lens unit 2 is moved by the amount indicated by the command 14H. There are many other commands sent from the camera-body microcontroller 12.

In the first embodiment of the present invention in which bidirectional communication is employed, some of the foregoing commands are not necessary. However, the table shown in FIG. 4A is necessary in order to maintain the compatibility with interchangeable lenses of earlier types that are not adapted to recent communication methods, and all of the commands in FIG. 4A are desirably stored in the camera-body microcontroller 12. FIG. 4B shows lens commands sent from the lens microcontroller 7. The number of bytes, shown in FIG. 4B, of data output from the lens microcontroller 7 is determined beforehand by a command, as in the case of the camera-body commands. For example, when a lens command 10H is sent from the lens microcontroller 7 to the camera-body microcontroller 12, the camera-body microcontroller 12 regards the command 10H as a request to receive optical data, and prepares to receive two-byte data. When the lens microcontroller 7 recognizes that the camera-body microcontroller 12 is ready to receive data, the lens microcontroller 7 outputs two-byte data from the terminal Lout. The camera-body microcontroller 12 that has received a synchronous clock signal duly transfers the data to a two-byte data area that has been prepared as described above. Other exemplary commands include the following. A command 12H is a request to receive three-byte data indicating the lens state (during focusing and aperture adjustment). A command 14H is a request to receive four-byte data specific to the interchangeable lens 1. A command 20H is a command to start various operations, i.e., a camera-body operation command to start operations performed in the camera body 17 initiated by a switch (not shown) provided to the interchangeable lens 1. Although there are many other commands sent from the lens microcontroller 7, detailed description thereof are omitted.

In the still image shooting mode of the first embodiment and in the communication with a known interchangeable lens, request commands to send various kinds of data are sent from the camera body 17 while the state of the interchangeable lens is monitored on the side of the camera body 17. In the movie shooting mode of the first embodiment, if the state of the interchangeable lens 1 changes or the optical data sent in the last communication is updated, the interchangeable lens 1 can communicate with the camera body 17 without a request from the camera body 17. This means that redundant communication is eliminated. Consequently, the microcontrollers can be more efficiently used for other processing. Alternatively, if relatively inexpensive microcontrollers having lower performance are used, the manufacturing cost can be reduced.

In the first embodiment, UART communication is employed as an alternative to synchronous clock communication in one direction. Any of other communication methods is also acceptable as long as the method employed for the communication in one direction does not require two communication terminals, unlike in the case of clock communication, and a signal can be sent from one of the microprocessor to the other without a request from the other. Such communication methods include USB communication and smart card communication.

Second Embodiment

Figure 5:
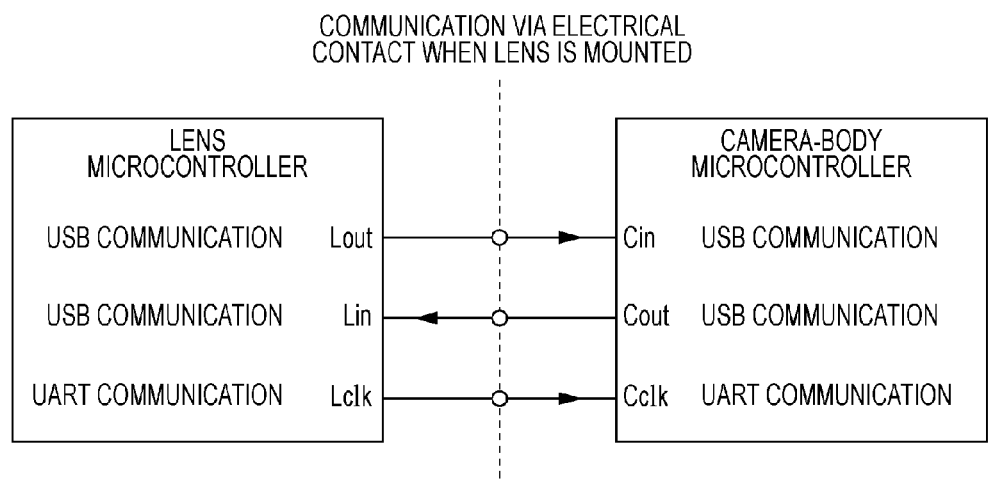
FIG. 5 shows a communication method according to a second embodiment of the present invention.

FIG. 5 shows another exemplary combination of communication methods. In this case, USB communication and UART communication (as the second communication methods) are employed as communication functions provided to the microcontrollers 7 and 12. This combination is employed when the movie shooting mode is selected by using the mode changing switch 18. Communication terminals of the lens microcontroller 7 are shown on the left, and communication terminals of the camera-body microcontroller 12 are shown on the right. The microcontrollers 7 and 12 are connected to each other via the contact point unit 14. The lens microcontroller 7 has a lens data output terminal Lout employing USB communication, a camera-body data input terminal Lin employing USB communication, and an output terminal Lclk employing UART communication. The camera-body microcontroller 12 has a lens data input terminal Cin employing USB communication, a camera-body data output terminal Cout employing USB communication, and an input terminal Cclk employing UART communication. Many of recent microcontrollers employ USB communication terminals, which are available at relatively low costs. The configuration in this case allows independent communication among the three communication lines. Therefore, communication at higher speed can be realized.

Third Embodiment

Figure 6:
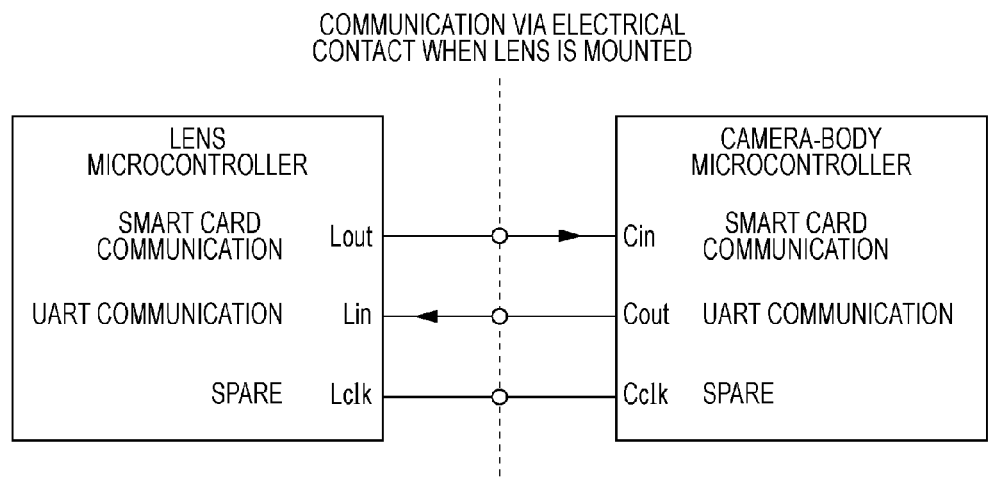
FIG. 6 shows a communication method according to a third embodiment of the present invention.

FIG. 6 shows another exemplary combination of communication methods. In this case, smart card communication and UART communication (as the second communication methods) are employed as communication functions provided to the microcontrollers 7 and 12. Communication terminals of the lens microcontroller 7 are shown on the left, and communication terminals of the camera-body microcontroller 12 are shown on the right. The microcontrollers 7 and 12 are connected to each other via the contact point unit 14. The lens microcontroller 7 has a lens data output terminal Lout employing smart card communication, a camera-body data input terminal Lin employing UART communication, and a spare terminal Lclk. The camera-body microcontroller 12 has a lens data input terminal Cin employing smart card communication, a camera-body data output terminal Cout employing UART communication, and a spare terminal Cclk. Smart card communication is also employed in many recent microcontrollers, and terminals employing this method are available at relatively low costs. The combination of UART communication and smart card communication, shown in FIG. 6, is also acceptable as a major feature of the present invention.

Figure 7:
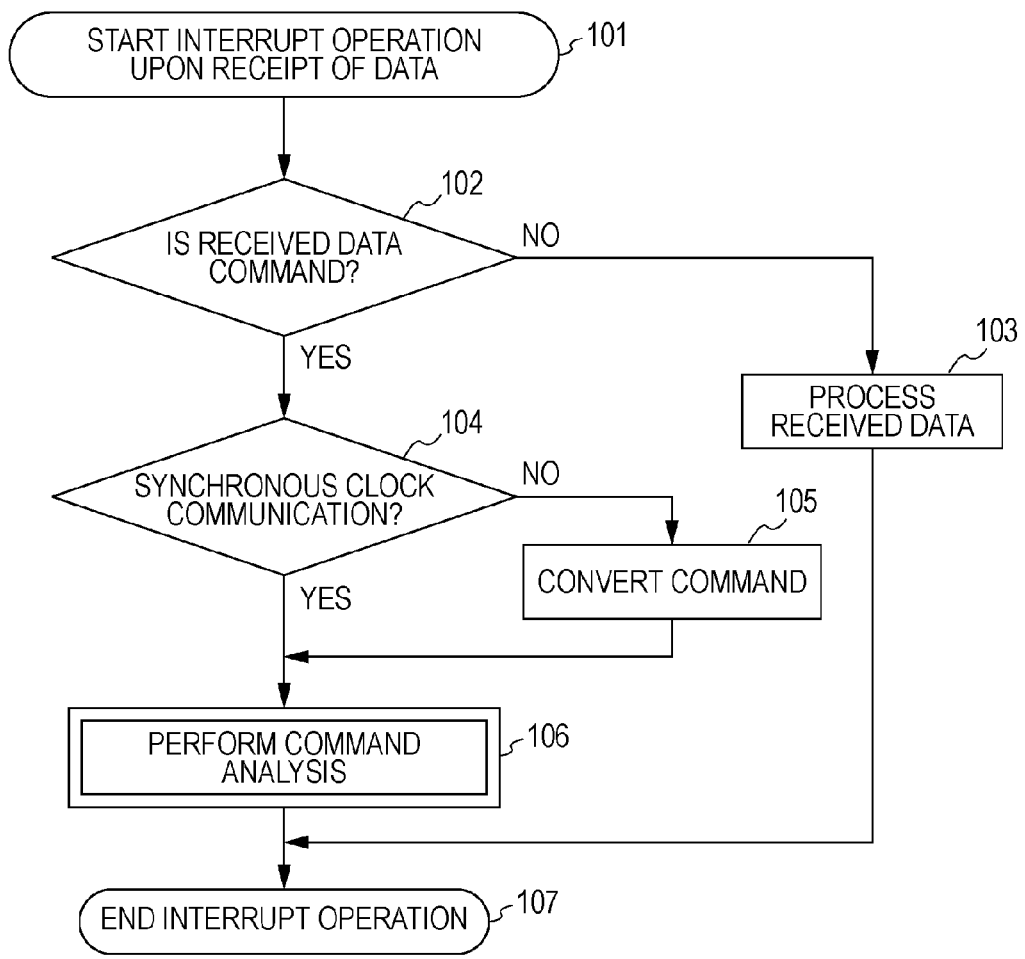
FIG. 7 is a flowchart of an interrupt operation upon data receipt performed in each of a camera body and an interchangeable lens.

Referring to flowcharts shown in FIGS. 7 to 10, operations of the lens microcontroller 7 and the camera-body microcontroller 12 will now be described in more detail. The flowcharts shown in FIGS. 7 to 10 are commonly applied to the first to third embodiments. FIG. 7 shows an interrupt operation performed by one of the microcontrollers 7 and 12 that is on the data-receiving side in a case where communication employing any of the aforementioned methods, including synchronous clock communication, UART communication, USB communication, and smart card communication, is performed. The camera-body microcontroller 12 and the lens microcontroller 7 perform a common operation upon receipt of communication data.

In the embodiments, when the interchangeable lens 1 is mounted on the camera body 17, synchronous clock communication, which is the same communication method as in known techniques, is performed first, whereby the correspondence between the communication methods of the camera-body microcontroller 12 and the lens microcontroller 7 is checked. After the check, the communication method is changed in accordance with the mode of the camera body 17. For example, if the camera body 17 employs any second communication methods, including UART communication and smart card communication, in addition to synchronous clock communication (the first communication method) but the interchangeable lens 1 that has been mounted thereon is of known type employing only synchronous communication (the first communication method), communication is performed only by means of synchronous clock communication. If the interchangeable lens 1 employs both UART communication and synchronous clock communication, the communication method is changed in accordance with the shooting mode. If the interchangeable lens 1 employs USB communication or smart card communication, the communication method is changed thereto.

Step 101

When either of the camera-body microcontroller 12 and the lens microcontroller 7 detects that certain data has been received during communication therebetween, the microcontroller that has received the data starts an interrupt operation.

Step 102

Whether the data that has been received is a command or simple data is checked. As described with reference to FIGS. 4A and 4B, the contents of data desired to be handled between the microcontrollers is first sent as a camera-body command or a lens command from one of the microcontrollers to the other. In this command, the number of bytes of the data to be handled in response to the command is defined. After the command is sent, the data defined by the command is received or sent in a subsequent communication operation. Thus, whether the data that has been received in the current communication operation is a command or simple data is checked in this step.

When the interchangeable lens 1 is newly mounted on the camera body 17 or when one of the camera-body microcontroller 12 and the lens microcontroller 7 employs only synchronous clock communication, communication is performed only by means of synchronous clock communication. In such a case, the same communication method as in the technique disclosed in Patent Citation 1 described in Background Art is employed. In this method, there are no lens commands and therefore the camera-body microcontroller 12 always regards the data that has been received is simple data from the lens microcontroller 7.

Step 103

If the check in step 102 shows that the data that has been received is not a command but simple data, the data is stored into a memory provided in the microcontroller. The data that has been stored will be used in control operations to be performed later.

Step 104

If the check in step 102 shows that the data that has been received is a command, the current communication method is checked. Specifically, the current communication method is identified from among synchronous clock communication, UART communication, USB communication, smart card communication, and the like.

Step 105

If the current communication method is other than synchronous clock communication, the command that has been received is converted for use in synchronous clock communication. This is because known camera bodies and interchangeable lenses to which none of the embodiments of the present invention is applied analyze commands and data by means of synchronous clock communication. By utilizing a known command processing method employing synchronous clock communication, subsequent operations for command analysis can be unified, and consequently the program efficiency can be improved.

Step 106

The command that has been converted for use in synchronous clock communication is analyzed in this step. This step will be described separately below with reference to FIG. 9.

Step 107

The interrupt operation is finished.

Figure 8:
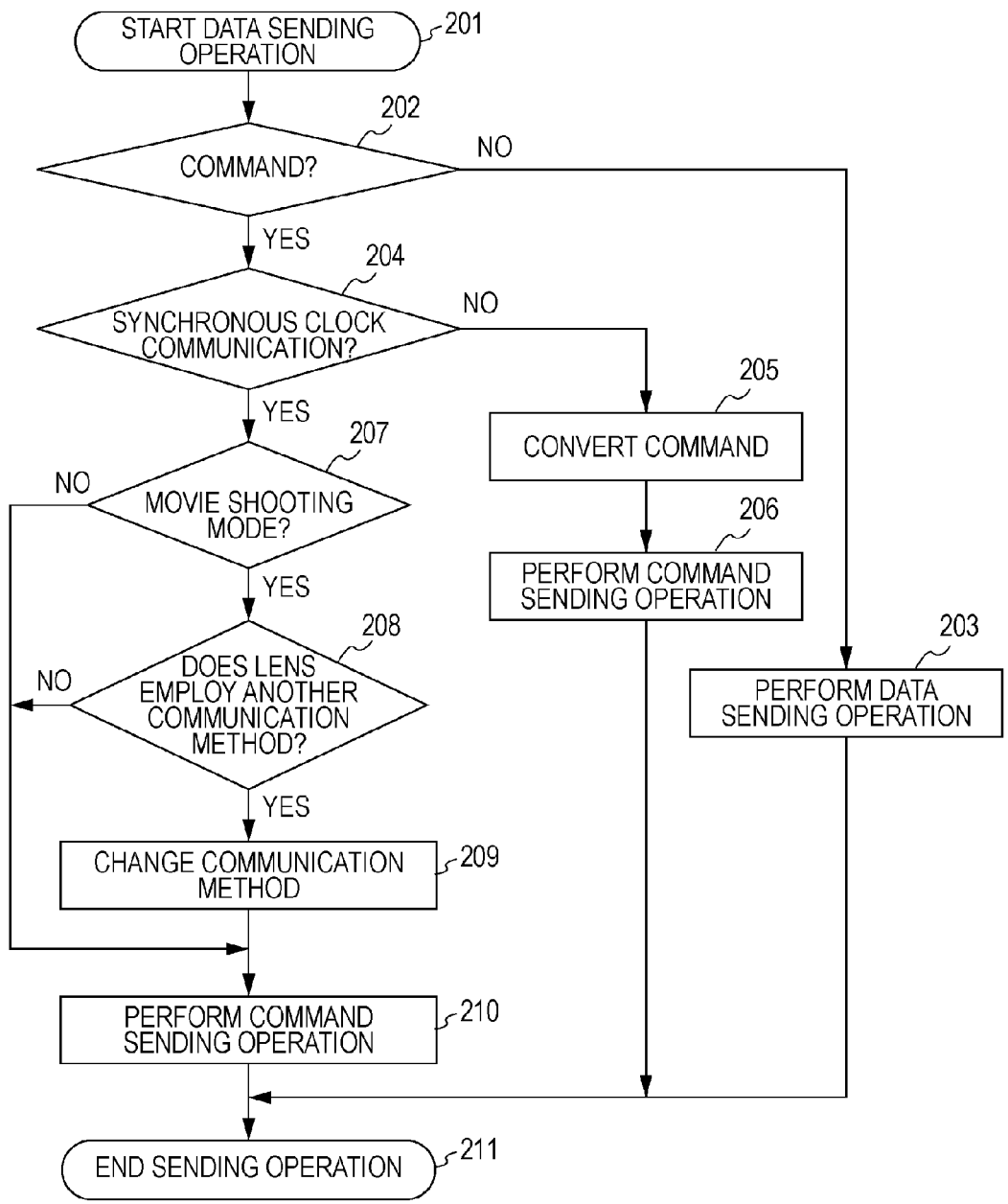
FIG. 8 is a flowchart of an operation performed by a camera-body microcontroller.

FIG. 8 is a flowchart showing a data sending operation performed by the camera-body microcontroller 12. Referring to FIG. 8, description of the embodiments of the present invention will now be further described.

Step 201

This operation is practically performed in cases where the camera-body microcontroller 12 gives the lens microcontroller 7 an instruction to perform a drive operation for correction and where the communication method is to be changed. Description of the drive operation for correction has been made with reference to FIG. 1. Therefore, the operation performed in the case where the communication method is to be changed will now be described in detail with reference to FIG. 8.

Step 202

First, whether the data to be sent to the lens microcontroller 7 is a command or simple data is checked.

Step 203

If the data to be sent to the lens microcontroller 7 is simple data, appropriate data is acquired from the memory in which various pieces of data to be sent have been stored beforehand, the communication unit is set so as to be capable of sending the data, and the data that has been acquired is fed to the communication unit, whereby communication is started.

Step 204
If the data to be sent to the lens microcontroller 7 is a command, whether or not the current data communication is performed by means of synchronous clock communication is checked.

Step 205
If the current communication method is other than synchronous clock communication, the command is converted for use in any of UART communication, USB communication, and smart card communication.

Step 206
After the command conversion in step 205, the communication unit is set so as to be capable of sending the converted command, and appropriate data acquired from the memory is fed to the communication unit, whereby communication is started.

Step 207
If the check in step 204 shows that the current data sending method employs synchronous clock communication, whether the current shooting mode is the movie shooting mode or the still image shooting mode is checked. This check can be made with reference to the state of the mode changing switch 18.

If the mode changing switch 18 is set for the still image shooting mode, the same communication method as in the known technique is employed. Therefore, the operation proceeds to step 210. If the mode changing switch 18 is set for the movie shooting mode, the operation proceeds to step 208.

Step 208
The camera-body microcontroller 12 reads beforehand from the lens microcontroller 7 information indicating communication methods employed by the interchangeable lens, thereby checking in this step whether or not the interchangeable lens 1 employs another communication method in addition to synchronous clock communication.

If the interchangeable lens 1 employs only synchronous clock communication, the operation proceeds to step 210. If the interchangeable lens 1 employs another communication method in addition to synchronous clock communication, the operation proceeds to step 209.

Step 209
The current shooting mode is the movie shooting mode, and the interchangeable lens 1 employs another communication method (the second communication method) in addition to synchronous clock communication. This means that the camera-body microcontroller 12 needs to receive a large amount of data from the lens microcontroller 7. To handle such data, the camera-body microcontroller 12 operates so as to change the communication method. Before changing the communication method, the camera-body microcontroller 12 identifies the another communication method employed by the lens microcontroller 7, determines the identified communication method as the optimum communication method, and sets the communication unit such that a command to change the communication method to the determined method can be sent to the lens microcontroller 7 by means of synchronous clock communication. Once the lens microcontroller 7 receives the command, further communication operations between the camera-body microcontroller 12 and the lens microcontroller 7 are performed such that, for example, the lens microcontroller 7 sends data by means of synchronous clock communication and receives data by means of the determined communication method (UART, USB, or smart card communication).

Step 210
The communication unit is set so as to be capable of sending the command, and appropriate data corresponding to the command is fed to the communication unit, whereby communication is started.

Figure 9:
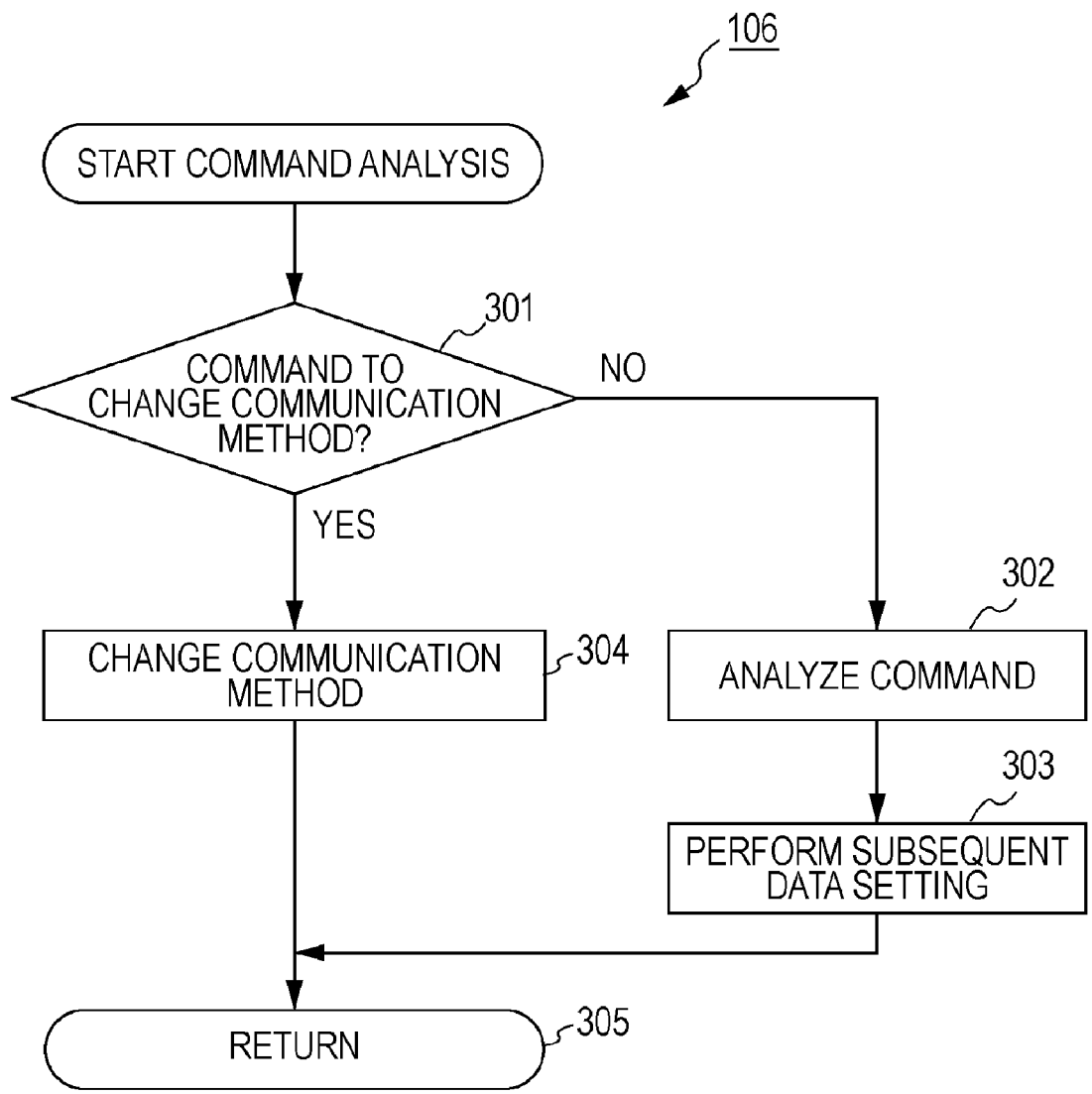
FIG. 9 is a flowchart of command analysis.

Step 211
The sending operation is finished. FIG. 9 is a flowchart of a subroutine for command analysis, which has been mentioned in the interrupt operation upon data receipt described with reference to FIG. 7. The subroutine will now be described.

Step 301
First, the camera-body microcontroller 12 or the lens microcontroller 7 checks whether or not the command that has been received is a command to change the communication method. If the command that has been received is a command to change the communication method, the operation proceeds to step 304.

Step 302
If the check in step 301 shows that the command that has been received is not a command to change the communication method, the command is analyzed.

Step 303
If the result of the command analysis in step 302 shows that the command is a request to send data, data required for sending necessary data is acquired from the memory. If the command is a request to perform various drive operations for correction, a control operation to realize such drive operations for correction is performed.

Step 304
If the command that has been received in step 301 is a command to change the communication method, the command is analyzed and the method used to perform further communication operations is changed to any of synchronous clock communication, UART communication, USB communication, and smart card communication. The determination of the communication method and the setting of the command to change the communication method are made in step 209 shown in FIG. 8.

Practically, steps 301 and 304 are intended to change the communication method of the lens microcontroller 7. In the camera-body microcontroller 12, steps 301 and 304 are performed only in a case where the communication method of the lens microcontroller 7 is to be changed to synchronous clock communication, a known communication method, for some reason.

Figure 10:
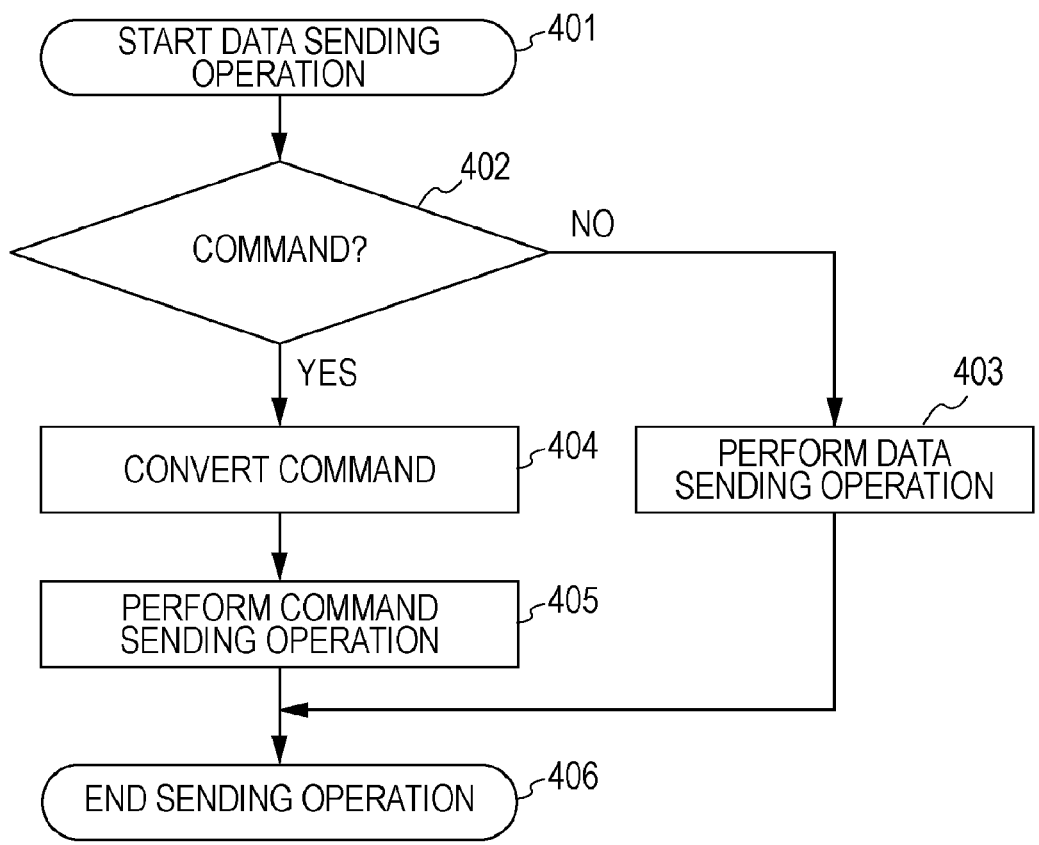
FIG. 10 is a flowchart of an operation performed by a lens microcontroller.

Step 305
The operation returns to step 106, shown in FIG. 7, in the operation performed before this subroutine. FIG. 10 is a flowchart of a data sending operation performed by the lens microcontroller 7. This operation will now be described with reference to FIG. 10.

In synchronous clock communication, i.e., a known communication method, since no communication is performed in a direction from the lens microcontroller 7 to the camera-body microcontroller 12, this data sending operation is ignored. However, a major feature of the present invention is that the lens microcontroller 7 can perform a sending operation so as to send a large amount of data on the interchangeable lens 1. This operation is performed only when the interchangeable lens 1 is found to employ any of other communication methods, such as UART communication, USB communication, and smart card communication, in addition to known synchronous clock communication.

Steps 401 and 402
The lens microcontroller 7 examines data to be sent to the camera-body microcontroller 12 according to need, and checks whether the data to be sent in the current communication is a command or simple data. Specifically, if there is any new data to be sent, a corresponding command is first sent. If a command has already been sent and data for performing the command is to be sent, the data is sent.

Step 403

Since the data to be sent to the camera-body microcontroller 12 is simple data, appropriate data is acquired from the memory in which various pieces of data to be sent have been stored beforehand, the communication unit is set so as to be capable of sending the data, and the data that has been acquired is fed to the communication unit, whereby communication is started.

Step 404

Since the data to be sent to the camera-body microcontroller 12 is a command, the lens microcontroller 7 converts the command for use in the current sending method.

Step 405

After the conversion in step 404, the communication unit is set so as to be capable of sending the converted command, and appropriate data corresponding to the converted command is fed to the communication unit, whereby communication is started.

Step 406

The sending operation is finished.

While the embodiments of the present invention concern a system including a single-lens reflex camera body and an interchangeable lens, the present invention may also be applied to a video camera employing a still image shooting mode and a movie shooting mode, for example.

To summarize, according to the embodiments in which a system including devices employs a plurality of communication methods, communication between the devices can be performed at higher speed than in known techniques, by combining the plurality of communication methods even in a case where there are only two devices between which communication is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a National Stage filing of PCT application No. PCT/JP2009/001408 filed on Mar. 27, 2009 which claims priority from Japanese Patent Application No. 2008-110303, filed on Apr. 21, 2008, all of which are hereby incorporated by reference herein in their entirety.

The invention claimed is:

1. A camera system comprising:
    an interchangeable lens;
    a camera body;
    a selector configured to select one of a still image shooting mode and a movie shooting mode; and
    a communication unit configured to control bidirectional communication between the interchangeable lens and the camera body by means of a plurality of communication methods,
    wherein, if the still image shooting mode is selected by the selector and a lens information request command is sent from the camera body to the interchangeable lens, the communication unit operates such that information on the interchangeable lens is sent from the interchangeable lens to the camera body, and
    wherein, if the movie shooting mode is selected by the selector, the communication unit operates such that the information on the interchangeable lens is sent from the interchangeable lens to the camera body even without the lens information request command being sent from the camera body to the interchangeable lens.

2. A camera body to and from which an interchangeable lens is attachable and removable, the camera body comprising:
    a camera-body-side communication unit configured to perform bidirectional communication with the interchangeable lens by means of a plurality of communication methods; and a checking unit configured to check which communication methods the interchangeable lens employs, wherein, when a lens information request command is sent from the camera body to the interchangeable lens, the checking unit checks whether or not the interchangeable lens employs a first communication method usable for sending information on the interchangeable lens to the camera body, wherein, even without the lens information request command being sent from the camera body to the interchangeable lens, the checking unit checks whether or not the interchangeable lens employs a second communication method usable for sending the information on the interchangeable lens to the camera body, and wherein, in accordance with a result shown by the checking unit, the camera-body-side communication unit uses one of the first and second communication methods so as to perform the bidirectional communication with the interchangeable lens.

3. The camera body according to claim 2, further comprising:
    a selector configured to select one of a still image shooting mode and a movie shooting mode,
    wherein, if the checking unit shows that the interchangeable lens employs the first and second communication methods, the camera-body-side communication unit performs the bidirectional communication only by means of the first communication method when the still image shooting mode is selected by the selector, and by means of the second communication method when the movie shooting mode is selected by the selector.

4. An interchangeable lens attachable to and removable from the camera body according to claim 3, the lens comprising:
    a lens-side communication unit employing the first and second communication methods.

* * * * *